INVENTORS
BAILEY BENNETT
GEORGE H. McFADDEN
AND JOHN F. LYMAN

Patented Feb. 28, 1950

2,498,785

UNITED STATES PATENT OFFICE 2,498,785

RUBBER ARTICLE AND METHOD OF MAKING SAME

Bailey Bennett and George H. McFadden, Columbus, and John F. Lyman, Westerville, Ohio, assignors to The Ohio State University Research Foundation, Columbus, Ohio, a corporation of Ohio Application July 2, 1947, Serial No. 758,580

4 Claims. (Cl. 260—723)

This invention relates to foamed latex and sponge made therefrom and is particularly concerned with a reinforced foamed latex sponge having improved physical properties.

It is therefore a primary object of this invention to provide a stabilized foamed latex and a sponge formed therefrom which has greater tensile strength, higher resistance to compression and less shrinkage tendencies than sponge made from the usual types of foamed latex.

In carrying out the above object, it is a further object of the invention to provide a filler material which is readily wetted by the latex during the whipping process and which, when incorporated therein in relatively small quantities, causes the above mentioned improvements in physical properties in the finished article. This filler material is glass fiber wherein each fiber has a definite length as differentiated from powdered or granular fillers. This linear dimension of the fiber is believed to be the reason for the improvement in tensile strength and tear resistance of sponge made from the foamed latex having the filler incorporated therein.

Another object of the invention is to provide a method for stabilizing and extending latex foam wherein glass fiber of predetermined length and quantity is added to the latex during the foaming operation and wherein such addition stabilizes the foam and effectively extends the same in its subsequent use. The stabilization of the foam is believed to occur through the large surface area presented by the glass fiber which also acts as an interlocking mesh-work or matrix within the foam and and thereby permits small, uniform sized bubbles of foam to be produced which are maintained through their contact with the surfaces of the glass fiber. The foam is effectively extended since it is possible to obtain similar compression figures on a given piece of cured foamed latex sponge extended, for example, seven times the original volume of the latex over foamed latex sponge extended considerably less in the original foaming operation wherein no glass fiber is used. Thus from an economic standpoint, the use of glass fiber is highly advantageous. In this respect, as little as 1% of glass fiber yields good extending qualities while having a marked effect on the stabilization of the foam since the foam will stand up for a longer period with the glass fiber therein than without the addition thereof.

Still another object of the invention is to provide a method for foaming latex wherein the latex may be brought to its desired foam volume more easily and quicker through the addition of glass fiber since the glass fiber tends to stiffen the foam and thus make it easier to beat or whip air therein.

Further objects and advantages of the present invention will be apparent from the following description, reference being had to the accompanying drawings, wherein preferred embodiments of the present invention are clearly shown.

Figure 1:
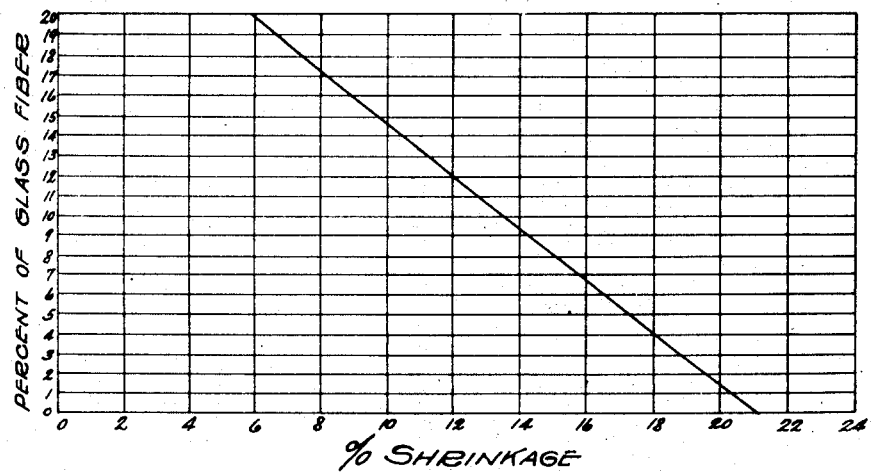
Fig. 1 is a chart showing a trend when percent of shrinkage is plotted against percent of glass fiber.
Figure 2:
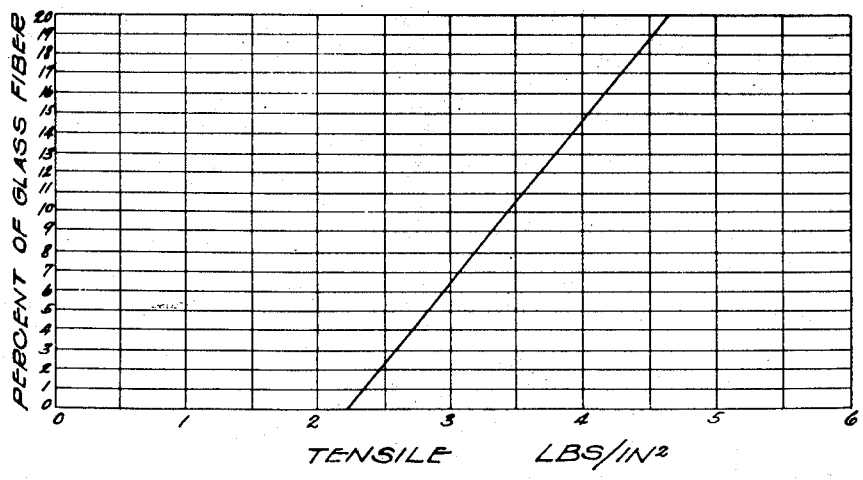
Fig. 2 is a similar chart showing percent of glass fiber plotted against tensile strength in pounds per square inch.
Figure 3:
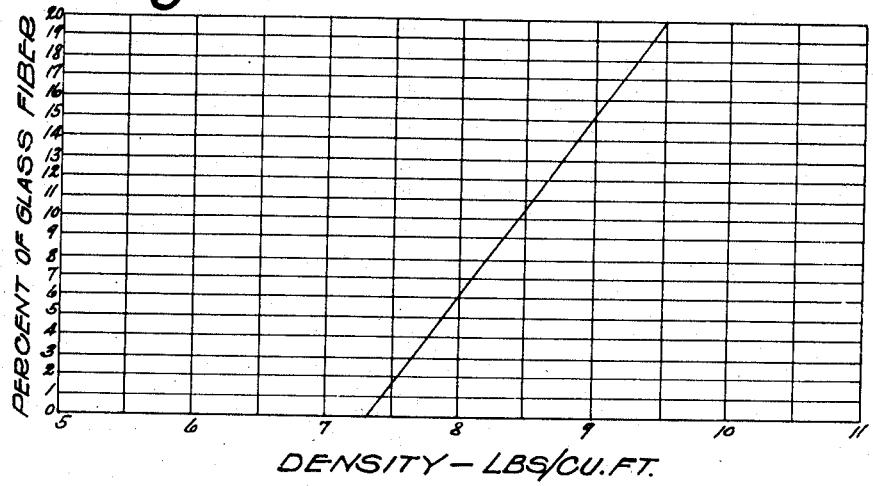
Fig. 3 is a chart similar to Fig. 1 showing percent of glass fiber plotted against density in pounds per square inch.
Figure 4:
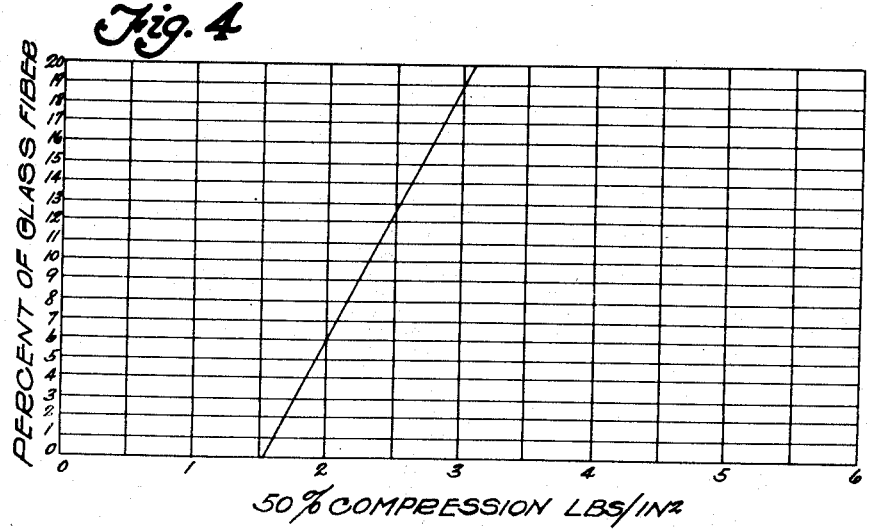
Fig. 4 is a chart similar to Fig. 1, showing percent of glass fiber plotted against the pounds per square inch required to compress the article 50% of its original free thickness.

In the manufacture of sponge rubber articles from foamed latex, numerous inherent problems are present, one of the most serious of these is the tendency of the foamed latex to shrink during curing and drying. This shrinkage is of considerable moment and necessitates molds having relatively greater dimensions in all directions than the desired dimensions of the finished article. Another inherent problem in foamed latex sponge is the very low tear resistance thereof due to an almost negligible strength. Thus the article, while standing up quite well under compression, has substantially no resistance toward tear and is easily destroyed when subjected to pulls. The present invention eliminates these problems and inherent difficulties by the inclusion of a specific filler which reduces the shrinkage tendencies during the cure and which greatly increases the tensile strength of the article. This filler on the other hand has no marked deleterious effects on the finished article when used within specific limits and since it is relatively inexpensive, it may be used commercially to provide improved sponge rubber articles.

The filler referred to is glass fiber. This fiber is made from Pyrex type sodium-boron glass which is mechanically drawn to an approximate average diameter of .002" per strand and is usually coated with an emulsified vegetable oil and a soluble starch. This coating is not a necessary adjunct to our invention since if the glass fiber is completely clean it will operate very well in the mixing process with the latex.

Problems in the manufacture of the foam per se are also many and the addition of glass fiber thereto in quantities as small as 1% by weight of the latex yields vastly improved foaming results. The foam is more stable and uniform. Furthermore, the foam may be brought up to the desired volume with greater ease due to the thickening effect of the glass fiber therein. So far as we are aware, glass fiber is the only material which has this effect. Other fiber materials, such as cotton flock, linters and the like, are difficult to incorporate within the latex and ball up during the mixing process. Glass fiber, on the other hand, is easily wetted and goes through the foam almost immediately upon its addition thereto in a uniform and easy manner.

The glass fiber may be purchased on the market from the Owens-Corning Fiberglas Corporation and is obtainable in various lengths which are provided by hammer-milling the glass fiber after the drawing thereof. Lengths of $\frac{1}{32}$, $\frac{1}{8}$ and $\frac{1}{4}$ of an inch, etc., are obtainable and in this respect we prefer $\frac{1}{8}$" glass fiber, although glass fibers ranging from $\frac{1}{32}$ to $\frac{1}{4}$" in length may be used with good results.

In all cases, the glass fiber either coated or uncoated, is easily wetted by the latex and readily mixes therethrough without balling or lumping during the foaming process. This fact is in direct contrast to other filler materials which are very difficult to incorporate into the latex and which must be ball-milled into a slurry prior to addition or must be added very slowly and with great care to prevent balling up. At this point, it should be definitely understood that glass fiber is entirely different in its action and incorporation than silica in finely powdered form. Powdered silica has been sold as a filler material and does not in any way produce results such as are obtainable through the use of glass fiber.

Any of the usual types of foamed latex compositions may be improved by the addition of fiber glass thereto. Latices such as butadiene-styrene copolymers, butadiene-acrylonitrile copolymers, polychloroprene latex, natural rubber latex, etc., or mixtures thereof may all be used with the glass fiber and it is to be understood that this invention is in no way limited to a specific type of latex since tests have proved that similar improved results are obtainable when using latices or mixtures thereof of any of the butalastic polymers or with natural rubbers or mixtures thereof.

From the charts it will be seen that the shrinkage is reduced markedly by as little as 1% of glass fiber and that the density and tensile strength is increased considerably thereby. In practice, we prefer to use between 2½ and 7½% glass fiber for economic reasons and for reasons to be discussed hereinafter, although 1 to 10% may be used to advantage.

It has been found that when high percentages of glass fiber are utilized that the foamed rubber sponge has a tendency to break down upon extended accelerated fatigue test. These fatigue tests were run on approximately a 12 x 12" sample, averaging about 1.400" in thickness and wherein the entire sample was compressed 50% of its thickness at a frequency of approximately sixty times per minute. 500,000 compression cycles were used. After this test, it was found that foamed latex sponge having no glass fiber therein showed little or no breakdown and displayed no apparent physical change. However, 15% glass fiber sponge showed a slight breakdown of the skin at the corners of the sample after approximately 250,000 cycles. 10% glass fiber sponge showed less breakdown and was in much better condition at the 500,000 mark than was the 15% test piece. Lower percentage of glass fiber displayed correspondingly improved results while the 2½% sample was in the same condition at the conclusion of the test as the sample containing no glass fiber. In this respect, the ultimate use of the foamed latex sponge will, to some degree, dictate the quantity of glass fiber incorporated therein. In other words, if the frequency of compression is small, higher percentages of glass fiber may be used to advantage if certain characteristics are desired. In all cases, upon fatique test, a permanent set was noticed and these figures for various percentages of glass fiber are as follows:

*Permanent set in percentage*

| Percent Glass Fiber ⅛ inch | Percent Set |
|---|---|
| 0 | 1.44 |
| 2½ | 1.42 |
| 10 | 1.75 |
| 15 | 4.78 |

These figures were obtained from thicknesses before and after 500,000 cycle fatigue test. All samples were made by compounding the latex in the usual manner to include a vulcanizing agent, accelerator, etc., and the latex was foamed to approximately seven times its original volume after which it was poured into molds and cured in open steam at approximately 45# pressure. Since all samples were made under similar conditions, it may be assumed that for changes in compounds and/or curing conditions that similar results will be obtained throughout the full series of varying glass fiber content.

Some representative formulas of foamed latices used are as follows:

In the Formulas 1, 2 and 3, the "master" batch includes ingredients in proportions listed below

| | |
|---|---|
| Zinc oxide | grams 600 |
| Sulfur | do 240 |
| Zenite special | do 156 |
| Ethyl zimate | do 44 |
| Agerite white | do 120 |
| Titanium oxide | do 180 |
| 10% casein solution | cc 454 |
| 20% {Aquarex ME, 40 parts; Aquarex MS, 50 parts; Darvan #1, 10 parts} Solution in water | cc 432 |
| 10% Darvan #1 solution | cc 151 |

*Formula #1*

| | Parts |
|---|---|
| Polychloroprene latex (type 60) | 1000 |
| Petrolatum emulsion (50%) | 40 |
| "Master" batch | 50-175 |
| Glass fiber (⅛") | 30-110 |
| PHR solution (20%) | 36 |

*Formula #2*

| | Parts |
|---|---|
| Latex {Natural latex (60%), 580-700 parts; Butadiene styrene copolymer latex (60%), 420-300 parts} | 1000 |
| "Master" batch | 50-175 |
| Glass fiber (⅛") | 30-110 |

Formula #3

| | Parts |
|---|---|
| Natural latex (60%) | 1000 |
| "Master" batch | 50–175 |
| Glass fiber (⅛") | 30–110 |
| Soap solution | 25 |

In all the above formulas, the ingredients are added gradually with whipping in the order named (beater is a Hobart squirrel cage type or equivalent) until volume is about seven times starting volume. A gelling agent is then added and beating is continued for about 30–40 seconds after which the foam is poured into molds and cured at 35–45 p. s. i. steam for about 20 minutes.

The gelling agent may be sodium silica fluoride or potassium fluorotitanate or fluorozirconate in quantities of from about 1% to 5% of the total weight of ingredients.

It is understood that the foregoing formulas are merely exemplary of many different formulas which may be used and the use of glass fiber is in no way limited to the specific formulas noted but may be added to advantage in any foamed latex that is to be used in the manufacture of sponge.

From the foregoing it is quite evident that we have improved the physical characteristics of foamed latex sponge by the inclusion of specific quantities of a definite type of glass fiber and that these improvements make the sponge of considerably more value in the manufacture of seat cushions, pads and other sponge rubber articles. In all cases, the addition of glass fiber improves the density while not requiring an increase in the quantity of latex used. Thus from an economic standpoint, the finished article is of greater value since it includes no more rubber but has a greater density and tensile strength together with a more constant size due to reduction in shrinkage during curing and drying. Furthermore, as explained herein, the use of glass fiber as a stabilizer and foam extender is of considerable value since the foam is easier to form, is more stable and the quantity of latex used per piece is actually less for a given compression figure. The inclusion of glass fiber also yields better control conditions as it stiffens the foam and permits easier manipulation and control thereof whereby the foam may be spread on a support without a mold and may be cured in open steam.

The addition has the added advantage of changing the physical tendencies of the sponge made from the foam. The interlacing of the glass fiber and latex creates a condition of strength that minimizes side-sway when the sponge is used in cushions or pads whereby movement is mainly taken up in one plane rather than two as is the usual case when no glass fiber is used.

While the embodiments of the present invention as herein disclosed, constitute preferred forms, it is to be understood that other forms might be adopted, all coming within the scope of the claims which follow.

What is claimed is as follows:

1. A sponge rubber article made from cured foamed latex, said article including a reenforcing material comprising, glass fiber therein in quantities of from 1 to 10% by weight, said fiber having an average length of between $\frac{1}{32}$ and ¼ of an inch, said material being included for improving the tensile strength, compressibility and density of the article and for reducing the tendency toward shrinkage during curing.

2. A sponge rubber article made from cured foamed latex and including a reenforcing material therein, which consists of glass fiber having an average length in the neighborhood of ⅛ of an inch and being present in quantities of from 2½ to 7½% by weight of the latex used, said reinforcing material improving the physical characteristics of the sponge rubber article and particularly the tensile strength, resistance toward compression and density.

3. A resilient pad made from rubber-like material taken from the class consisting of natural rubber, butalastic polymers and mixtures thereof wherein the article is made from the latex which is cured in the foamed condition and which includes a reenforcing material therein consisting of, glass fiber having an average length between $\frac{1}{32}$ and ¼ of an inch, and being present in quantities of from 1 to 10% by weight of the latex used, said reenforcing material improving the tensile strength and resistance toward compression of the pad and reducing the tendency toward shrinkage during curing thereof.

4. A resilient pad made from rubber-like material, taken from the class consisting of natural rubber, butalastic polymers and mixtures thereof wherein the article is made from the latex which is cured in the foamed condition and which includes a reenforcing material consisting of, glass fiber having an average length of ⅛ of an inch and being present in quantities of from 2½ to 7½% by weight of the latex, said reenforcing material improving the tensile strength and resistance toward compression of the pad and reducing the tendency toward shrinkage during curing thereof.

BAILEY BENNETT.
GEORGE H. McFADDEN.
JOHN F. LYMAN.

REFERENCES CITED

The following references are of record in the file of this patent:

UNITED STATES PATENTS

| Number | Name | Date |
|---|---|---|
| 2,043,954 | Kershaw | June 9, 1936 |
| 2,140,063 | Talalay | Dec. 13, 1938 |
| 2,150,178 | Maywald | Mar. 14, 1939 |
| 2,240,014 | Peik | Apr. 29, 1941 |
| 2,288,686 | Daniels | July 7, 1942 |

FOREIGN PATENTS

| Number | Country | Date |
|---|---|---|
| 412,625 | Great Britain | July 2, 1934 |